United States Patent [19]

Ohsawa

[11] Patent Number: 5,066,515

[45] Date of Patent: Nov. 19, 1991

[54] ARTIFICIAL DIAMOND FORMING METHOD

[75] Inventor: Yuzoh Ohsawa, Ohmiya, Japan

[73] Assignee: Mitsubishi Materials Corporation, Tokyo, Japan

[21] Appl. No.: 554,135

[22] Filed: Jul. 16, 1990

[30] Foreign Application Priority Data

Nov. 21, 1989 [JP] Japan .................. 1-302526

[51] Int. Cl.$^5$ .................. B23K 26/00; B05D 5/12
[52] U.S. Cl. .................. 427/53.1; 427/227; 427/399; 423/446; 219/121.65; 219/121.66
[58] Field of Search .................. 427/53.1, 375, 376.1, 427/227, 399; 219/121.65, 121.66, 121.85, 121.6; 423/446

[56] References Cited

U.S. PATENT DOCUMENTS

| | | | | |
|---|---|---|---|---|
| 4,248,909 | 2/1981 | Whittaker | .................. | 427/162 |
| 4,751,193 | 6/1988 | Myrick | .................. | 427/53.1 |
| 4,954,365 | 9/1990 | Neifeld | .................. | 427/53.1 |

FOREIGN PATENT DOCUMENTS 58-135117  8/1983  Japan .

OTHER PUBLICATIONS

Collins et al., Appl. Phys. Lett. 5(3), Jan. 1989, pp. 216–218.

*Primary Examiner*—Shrive Beck
*Assistant Examiner*—Margaret Burke
*Attorney, Agent, or Firm*—Frishauf, Holtz, Goodman & Woodward

[57] ABSTRACT

A method of forming an artificial diamond, comprising applying a laser beam to a glassy solid carbon material, while moving a point on the glassy solid carbon material at which the laser beam is applied, to form a locally fused portion thereon, whereby every part of the locally fused portion is cooled as the point moves away therefrom. During cooling of the locally fused portion, an artificial diamond is formed in adjacent regions on both sides of the solidified locally fused portion.

12 Claims, No Drawings

ARTIFICIAL DIAMOND FORMING METHOD

BACKGROUND OF THE INVENTION

1. Field of the Invention

This invention relates to a method of forming an artificial diamond in a simple and easy manner.

2. Background Information

Conventional methods of forming an artificial diamon include a method disclosed in Japanese Patent Publication (Kokoku) No. 37-4406, which utilizes high temperature and high pressure for reaction of carbon, and a method disclosed in Japanese Patent Publication (Kokoku) No. 54-10558, which utilizes a shock wave caused by explosion for imparting impact to carbon.

However, the former method requires a large-sized and expensive equipment for creating a high-temperature and high-pressure state. Further, it takes a long synthesization time to obtain an artificial diamond. Still further, it requires the use of a solvent for dissolving carbon powder to enhance the reactivity thereof. The solvent can remain in the produced diamond as an impurity.

On the other hand, the latter method only requires a very short synthesization time. However, it has the disadvantage that actual forming conditions under which an artificial diamond is formed are very difficult to control.

SUMMARY OF THE INVENTION

It is therefore the object of the invention to provide an artificial diamond forming method, which is capable of obtaining an artificial diamond through a simplified and easy operation.

In order to attain the above object, the present invention provides a method of forming an artificial diamond, comprising applying a laser beam to a glassy carbon solid material, while moving a point on the glassy solid carbon material at which the laser beam is applied, to form a locally fused portion thereon, whereby every part of the locally fused portion is cooled as the point moves away therefrom.

The above and other objects, features and advantages of the invention will be more apparent from the ensuing detailed description.

DETAILED DESCRIPTION

Under the above stated circumstances, the present inventors have made studies in order to form an artificial diamond by a method different from the above conventional methods, and have reached the following finding:

If a glassy carbon solid material (hereinafter called "the carbon material" unless otherwise specified) as a raw material is irradiated by a laser beam at an outer surface thereof, while moving the irradiation point on the carbon material such that the outer surface portion of the carbon material is locally fused continuously or intermittently to form a continuous fused portion of discontinuous fused portions thereon, the fused portion or portions are cooled and solidified with the movement of the irradiation point away from each part of the fused portion. During cooling of the locally fused portion, there occurs a phenomenon that an artificial diamond is formed in adjacent regions on both sides of the solidified locally fused portion.

The movement of the irradiation point of the laser beam on the carbon material is carried out by moving either the laser beam or the carbon material with the other held stationary or moving both of them relative to each other. Preferably, the glassy carbon solid material may be hard carbon formed through a solid-phase thermal decomposition of an organic substance, as defined in the HandBook of Chemistry (Application), Third Edition, by The Chemical Society of Japan, and The Encyclopaedia Ceramics, (1986) 76, by The Yohgyou Association of Japan. Such hard carbon has high strength, high hardness, high purity, high oxidation resistance, and impermeability.

The present invention is based upon the above finding.

According to the method of the invention, a laser beam is applied to a glassy carbon solid material, while moving a point on the glassy carbon material at which the laser beam is applied, to form a locally fused portion thereon, whereby every part of the locally fused portion is cooled as the point moves away therefrom.

The laser beam may be continuously applied to form a continuous fused portion. Alternatively, the laser beam may be intermittently applied to form a discontinuous fused portion.

The beam-applying point may be moved by moving either the carbon material or the laser beam. Alternatively, it may be moved by moving both of the carbon material and the laser beam.

Preferably, the glassy carbon material is hard carbon formed from an organic substance through a solid-phase thermal decomposition thereof.

Also preferably, the laser beam is a carbonic acid gas laser beam.

To obtain a satisfactory artificial diamond, the diamond forming conditions should be as follows, for example:

The laser beam is applied to the carbon material in an atmospheric gas flow under a pressure within a range of 200 to 1000 torr. The atmospheric gas should be a gas selected from the group consisting of He, Ar, $N_2$, and $H_2$. The atmospheric gas is supplied at a flow rate of 3.0 l/min. The laser beam is applied to the carbon material at an output density of $1 \times 10^6$ to $8 \times 10^6$ W/cm$^2$.

Preferably, the point is moved in two directions orthogonal to each other at a speed of 2 to 5 cm/min in one direction and 0.2 to 0.5 cm/min in the other direction.

An example of the invention will now be explained hereinbelow.

EXAMPLE

First, disc-shaped pieces Nos. 1–17 of a glassy carbon solid material which is sold on the market were prepared, each having a size of 80 mm in outer diameter and 3 mm in thickness.

Then, the prepared pieces were each placed onto and fixed to a support plate arranged within a reactor vessel. The support plate is horizontally movable in two directions orthogonal to each other, i.e. in longitudinal and transverse directions within the reactor vessel. A laser beam gun with a lens was mounted onto the top of the reactor vessel such that it is directed toward the carbon material piece within the reactor vessel. The interior of the reactor vessel was evacuated to a pressure of $10^{-3}$ to $10^{-4}$ torr, into which a flow of atmospheric gas was then supplied under conditions specified in Table. To generate a laser beam, a carbonic acid gas-laser beam generator having an output power of 1 kW was used.

The generated laser beam was continuously irradiated through the laser beam gun against the outer surface of the carbon material piece for 30 minutes, at a output density shown in the Table. During the irradiation with the laser beam, the carbon material piece was continuously moved relative to the laser beam in the longitudinal and transverse directions at a predetermined moving speed shown in the Table, such that the irradiation point of the laser beam on the piece forms a U-shaped orbital path. By the irradiation with the laser beam, the carbon material piece was locally fused to form a continuous fused portion having a width of approximately 0.2 to 2 mm. As the irradiation point was moved away from each part of the fused portion, each part became cooled by the atmospheric gas and solidified, whereupon an artificial diamond was formed in the outer surface portion of the carbon material piece at regions adjacent to both sides of the fused portion.

The carbon material piece was thus formed with an artificial diamond.

An artificial diamond was removed from each carbon material piece, and measured in respect of the mean grain size and the amount of formation. The results of the measurement are shown in the Table.

As will be learned from the Table, the obtained artificial diamond pieces can be classified into two groups, one having grain sizes falling within a coarser range of 10 to 30 microns, and the other within a finger range of 0.5 to 1.5 microns. The artificial diamond pieces were subjected to a Raman spectroscopic analysis. It was ascertained that the obtained artificial diamond pieces are really crystalline diamond because Raman scattering spectrums appeared at $1332^{-1}$ cm.

Although in the above described example, the carbon material pieces were moved while the laser beam was held stationary, alternatively, the laser beam may be moved while the glassy carbon material pieces are held stationary. Further, both the carbon material pieces and the laser beam may be moved relative to each other.

Further, although in the above described example, the laser beam was continuously irradiated to form a continuous locally fused portion in the carbon material, the laser beam may be intermittently irradiated to form discontinuous locally fused portions, instead. Even with such discontinuous fusion, almost the same results of formation of an artificial diamond as in Example 1 described above may be obtained.

What is claimed is:

1. A method of forming an artificial diamond, comprising applying a laser beam to an outer surface of a glassy solid carbon material formed of hard carbon formed from an organic substance by solid-phase thermal decomposition thereof, while moving a point at which said laser beam is applied on said outer surface of said glassy solid carbon material so as to cause an outer surface portion of said glassy solid carbon material to be locally fused, to form pools of fused carbon, whereby each of said pools is cooled and solidified as said point moves away therefrom to form an artificial diamond, said laser beam being a carbonic acid gas laser beam and being applied to said outer surface of said glassy solid carbon material in an atmospheric gas flow at a pressure of 200 to 1000 torr at an output density of $1 \times 10^6$ to $8 \times 10^6$ W/cm$^2$, said atmospheric gas being a gas selected from the group consisting of He, Ar, $N_2$, and $H_2$.

2. The method as claimed in claim 1, wherein said laser beam is continuously applied to form a continuous fused portion.

3. The method as claimed in claim 1, wherein said laser beam is intermittently applied to form discontinuous fused portions.

4. The method as claimed in claim 1, wherein said point is moved by moving said glassy solid carbon material while said laser beam is held stationary.

5. The method as claimed in claim 1, wherein said point is moved by moving said laser beam while said glassy solid carbon material is held stationary.

6. The method as claimed in claim 1, wherein said point is moved by moving both of said glassy solid carbon material and said laser beam, relative to each other.

7. The method as claimed in claim 1, wherein said atmospheric gas is supplied at a flow rate of 3.0 l/min.

|  |  | ATMOSPHERIC GAS CONDITIONS | | | LASER BEAM | MOVING SPEED OF GLASSY CARBON MATERIAL (cm/min) | | OBTAINED ARTIFICIAL DIAMOND | |
|---|---|---|---|---|---|---|---|---|---|
|  |  | GAS | PRESSURE (torr) | FLOW RATE (l/min) | OUTPUT DENSITY (W/cm$^2$) | TRANSVERSE DIRECTION | LONGITUDINAL DIRECTION | MEAN GRAIN SIZE (μm) | AMOUNT OF FORMATION (g) |
| GLASSY CARBON MATERIALS | 1 | He | 200 | 3.0 | $1 \times 10^6$ | 3 | 0.3 | 6.1 | 1.6 |
|  | 2 |  | 500 |  |  |  |  | 5.2 | 2.1 |
|  | 3 |  | 760 |  |  |  |  | 4.0 | 1.5 |
|  | 4 |  | 1000 |  |  |  |  | 4.1 | 1.4 |
|  | 5 |  | 200 |  | $3 \times 10^5$ |  |  | 3.5 | 1.0 |
|  | 6 |  |  |  | $3 \times 10^4$ |  |  | 1.2 | 0.6 |
|  | 7 |  |  |  | $8 \times 10^3$ |  |  | 1.1 | 0.5 |
|  | 8 | Ar |  |  | $1 \times 10^6$ |  |  | 3.5 | 1.5 |
|  | 9 |  | 500 |  |  |  |  | 3.4 | 0.6 |
|  | 10 |  | 200 |  | $3 \times 10^4$ |  |  | 2.9 | 0.8 |
|  | 11 | $N_2$ |  |  | $1 \times 10^6$ |  |  | 3.8 | 0.5 |
|  | 12 |  | 500 |  | $3 \times 10^4$ |  |  | 2.1 | 0.6 |
|  | 13 | $H_2$ | 200 |  | $1 \times 10^6$ |  |  | 1.5 | 0.5 |
|  | 14 |  | 500 |  | $3 \times 10^4$ |  |  | 0.9 | 1.0 |
|  | 15 | He |  |  | $1 \times 10^6$ | 5 | 0.5 | 5.5 | 2.5 |
|  | 16 |  |  |  |  | 2 | 0.2 | 5.0 | 1.5 |
|  | 17 |  |  |  |  | 5 |  | 4.2 | 2.3 |

8. The method as claimed in claim 1, wherein said point is moved in two directions orthogonal to each other at a speed of 2 to 5 cm/min in one direction and 0.2 to 0.5 cm/min in the other direction.

9. The method as claimed in claim 8, wherein said atmospheric gas is supplied at a flow rate of 3.0 l/minute.

10. The method as claimed in claim 4, wherein said atmospheric gas is supplied at a flow rate of 3.0 l/minute.

11. The method as claimed in claim 5, wherein said atmospheric gas is supplied at a flow rate of 3.0 l/minute.

12. The method as claimed in claim 6, wherein said atmospheric gas is supplied at a flow rate of 3.0 l/minute.

* * * * *

UNITED STATES PATENT AND TRADEMARK OFFICE
CERTIFICATE OF CORRECTION

PATENT NO. : 5,066,515
DATED : November 19, 1991
INVENTOR(S) : OHSAWA

It is certified that error appears in the above-identified patent and that said Letters Patent is hereby corrected as shown below:

Title page, Item [56] under "FOREIGN PATENT DOCUMENTS", insert

-- 37-4406    6/1962    Japan
   54-10558   5/1979    Japan --.

Signed and Sealed this

Sixth Day of September, 1994

Attest:

BRUCE LEHMAN

*Attesting Officer*      *Commissioner of Patents and Trademarks*